United States Patent [19]
Chang

[11] Patent Number: 5,299,925
[45] Date of Patent: Apr. 5, 1994

[54] BICYCLE REAR-WHEEL HUB ASSEMBLY

[75] Inventor: David Chang, Taichung Shien, Taiwan

[73] Assignee: Taiwan Bicycle Industrial Development Co., Ltd., Taichung Shien, Taiwan

[21] Appl. No.: 795,744

[22] Filed: Nov. 21, 1991

[51] Int. Cl.⁵ .................. F16H 55/12; F16H 55/30
[52] U.S. Cl. ............................ 474/160; 474/164; 474/903
[58] Field of Search ........ 474/148, 158, 160, 162–164, 474/902, 903; 192/6 A, 48.4, 64; 74/447, 457, 594.2

[56] References Cited

U.S. PATENT DOCUMENTS

| | | | |
|---|---|---|---|
| 3,478,614 | 11/1969 | Shimano | 474/160 |
| 4,296,850 | 10/1981 | Isobe | 474/160 X |
| 4,299,581 | 11/1981 | Korosue | 474/70 X |
| 4,311,473 | 1/1982 | Sugimoto | 474/165 X |
| 4,580,670 | 4/1986 | Nagano | 474/106 X |
| 4,869,710 | 9/1989 | Iwasaki | 474/160 |

FOREIGN PATENT DOCUMENTS

| | | | |
|---|---|---|---|
| 621726 | 6/1961 | Canada | 474/903 |
| 2612870 | 9/1988 | France | 474/160 |

Primary Examiner—Britts, Ramon S.
Assistant Examiner—Roger J. Schoeppel
Attorney, Agent, or Firm—Bacon & Thomas

[57] ABSTRACT

A bicycle rear-wheel hub includes an inner casing disposed in the hub at one side, an outer casing disposed on the inner casing, an axle inserted through the hub and a set of flywheels disposed on the outer casing. The hub includes an inner thread and a wheel shoulder at one end, and a rubber ring set inside the wheel shoulder in front of the inner thread. The inner casing has an outer thread at one end for engaging with the inner thread of the hub. The inner casing also has a tool hole at the opposite end for inserting a tool. The outer casing has a number of elongated grooves around the outer wall surface for fastening the set of flywheels. The flywheels each has a number of inner projections formed in a center hole for engaging with the elongated grooves of the outer casing.

4 Claims, 5 Drawing Sheets

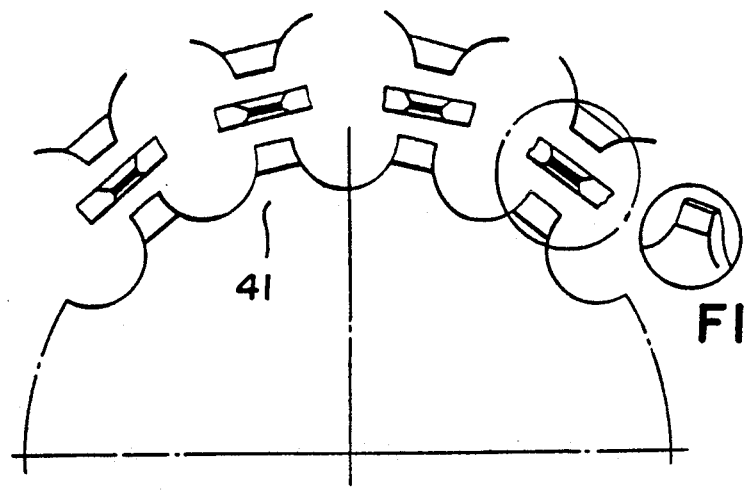
FIG. 5A
FIG. 5B
FIG. 5D
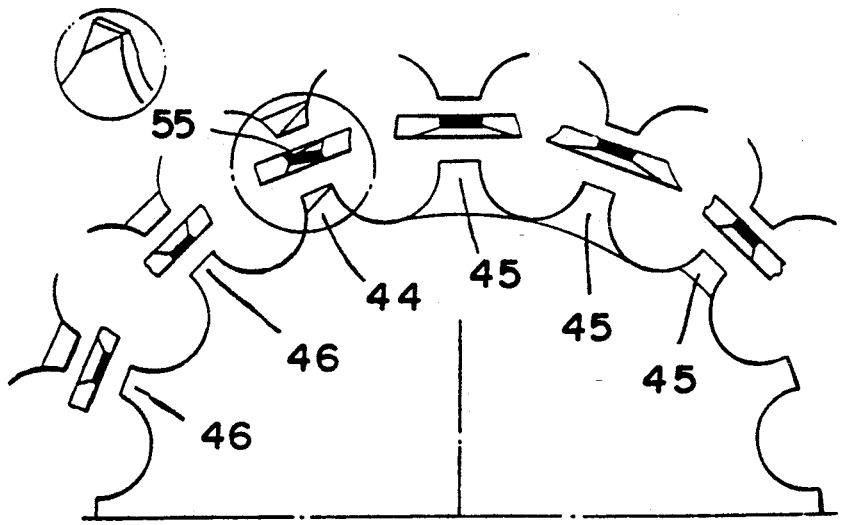
FIG. 5C

BICYCLE REAR-WHEEL HUB ASSEMBLY

BACKGROUND OF THE INVENTION

The present invention relates to bicycle rear-wheel hub assembly which is durable in use and can eliminate noise while changing the position of the bicycle chain.

Several flywheels may be simultaneously attached to a bicycle's rear-wheel hub for mounting the chain alternatively so that the speed of the bicycle can be changed. In regular speed changing bicycles, the smallest flywheel has total 14 teeth. Because of the number of teeth on the smallest flywheel is limited to 14 teeth, the speed of a speed changing bicycle can not be greatly improved. Further, because the tooth forms of the flywheels of a speed changing bicycle are not variable (see FIGS. 1 and 2), noise and friction problems will happen while changing the position of the chain, causing the chain to disconnect from place.

SUMMARY OF THE INVENTION

The present invention has been accomplished to eliminate the aforesaid disadvantages and problems. It is therefore an object of the present invention to provide a bicycle rear-wheel hub assembly which reduces the number of the teeth of the smallest flywheel to 13 teeth so as to increase its revolving speed.

It is another object of the present invention to provide a bicycle rear-wheel hub assembly which comprises a plurality of flywheels with respective tooth form specially arranged for conveniently loading or unloading the chain without producing noise.

According to the present invention, there is provided a bicycle rear-wheel hub assembly which is generally comprised of a hub, an inner casing fastened in said hub at one side, an outer casing mounted on said inner casing, an axle inserted through said hub, a set of flywheels mounted on said outer casing. The hub has an inner thread and a wheel shoulder at one end, and a rubber ring set inside the wheel shoulder in front of the inner thread. The inner casing has an outer thread at one end engaged into the inner thread in the hub with the rubber ring firmly squeezed in therebetween, and a tool hole at an opposite end for inserting a tool during the process of dismounting. The outer casing has a plurality of elongated grooves around the outer wall surface thereof in the longitudinal direction for fastening the flywheels. The flywheels each has a plurality of inner projection around a center hole respectively engaged into the elongated grooves on the outer casing. Further, the teeth of each flywheel include a plurality of guide teeth equidistantly spaced from one another, a plurality of outward teeth in the front of each guide tooth respectively included outward, and a plurality of inward teeth at the back of each guide tooth respectively inclined inward. This variable tooth form arrangement makes loading and unloading of the chain easy and smooth.

BRIEF DESCRIPTION OF THE DRAWINGS

FIGS. 5A through 5G are projection drawings showing the tooth forms of the flywheels of the bicycle rear-wheel hub assembly of the present invention;

DETAILED DESCRIPTION OF THE PREFERRED EMBODIMENT

Figure 1:
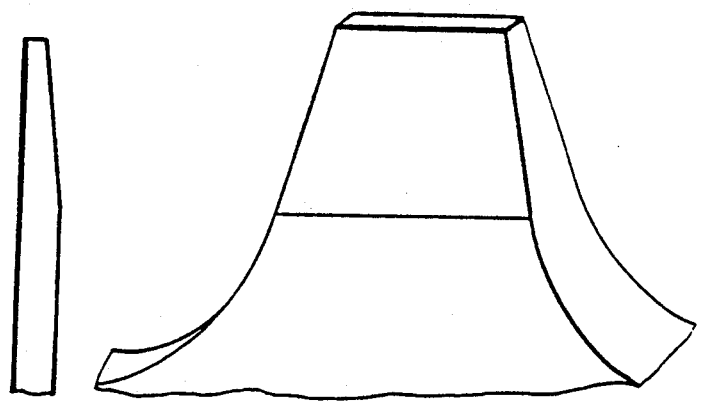
FIG. 1 illustrates the tooth form of a flywheel according to the prior art.
Figure 2:
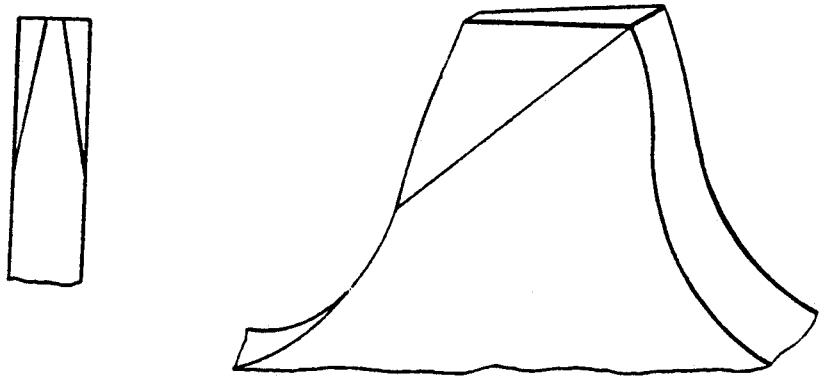
FIG. 2 illustrates the tooth form of another flywheel according to the prior art.
Figures 3, 3A:
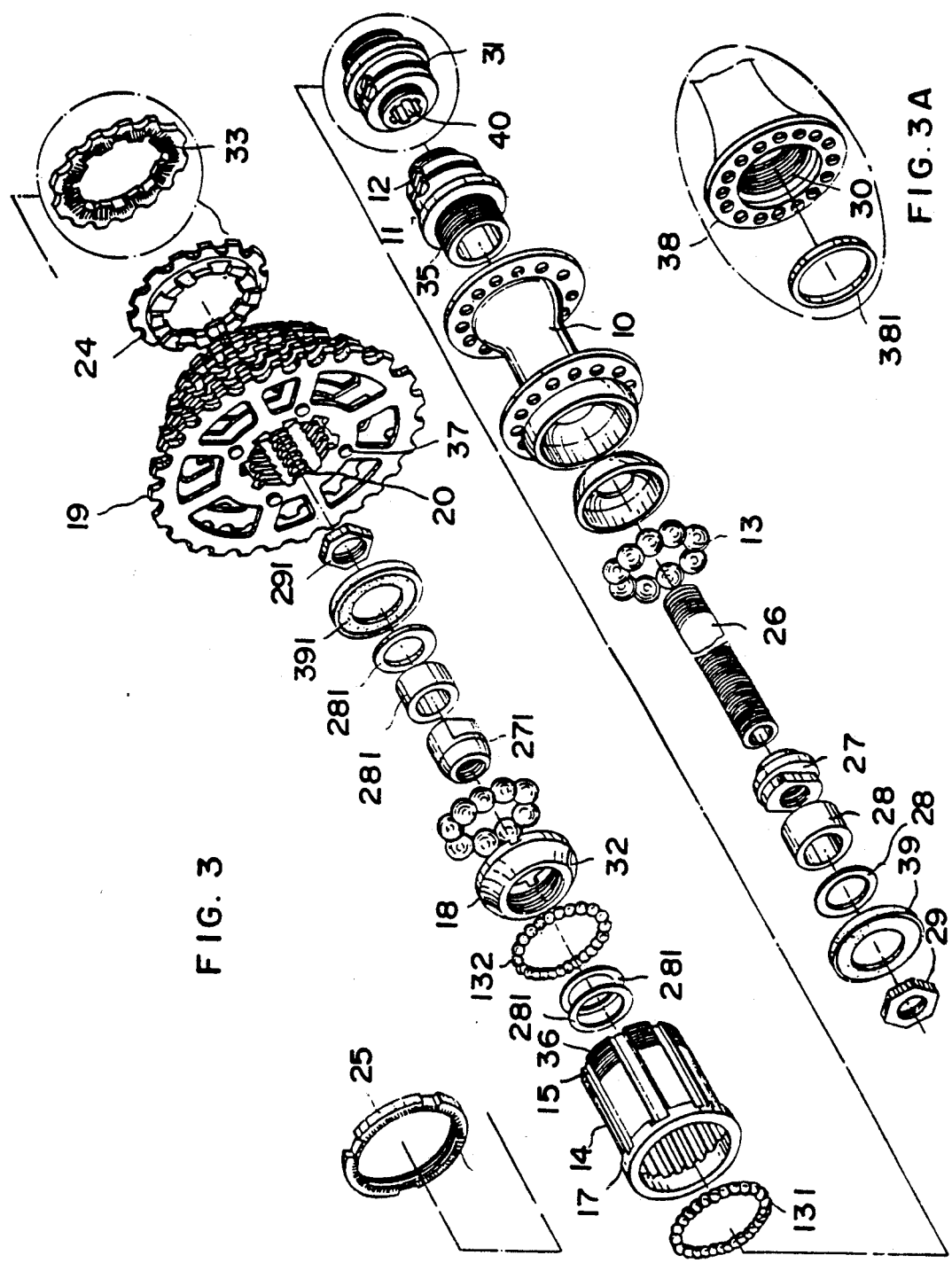
FIGS. 3 and 3A illustrate an exploded perspective view of a bicycle rear-wheel hub assembly embodying the present invention.
Figure 4:
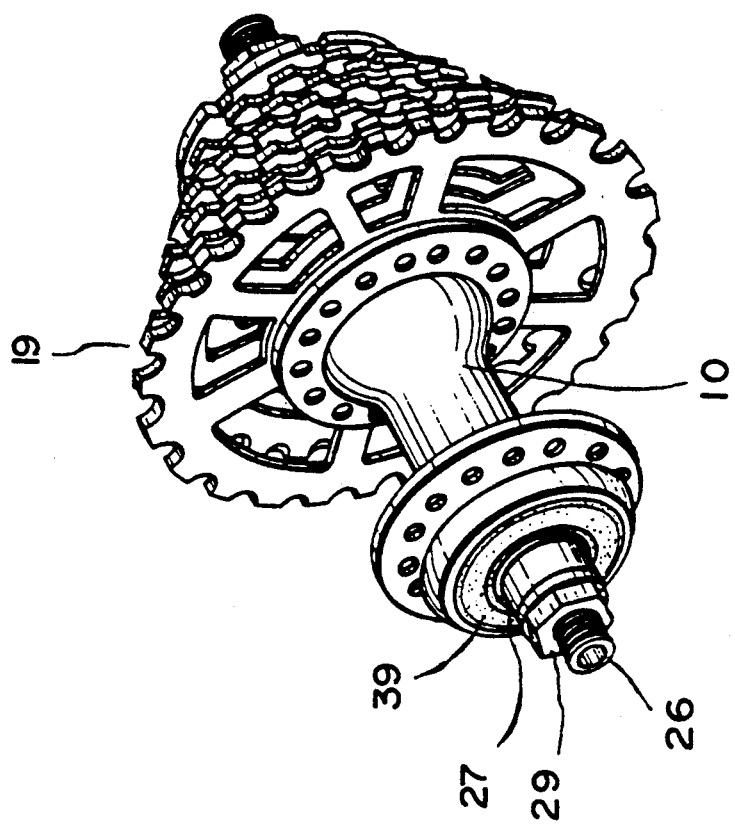
FIG. 4 is a perspective assembly view of the bicycle rear-wheel hub assembly of FIG. 3.
Figure 5E:
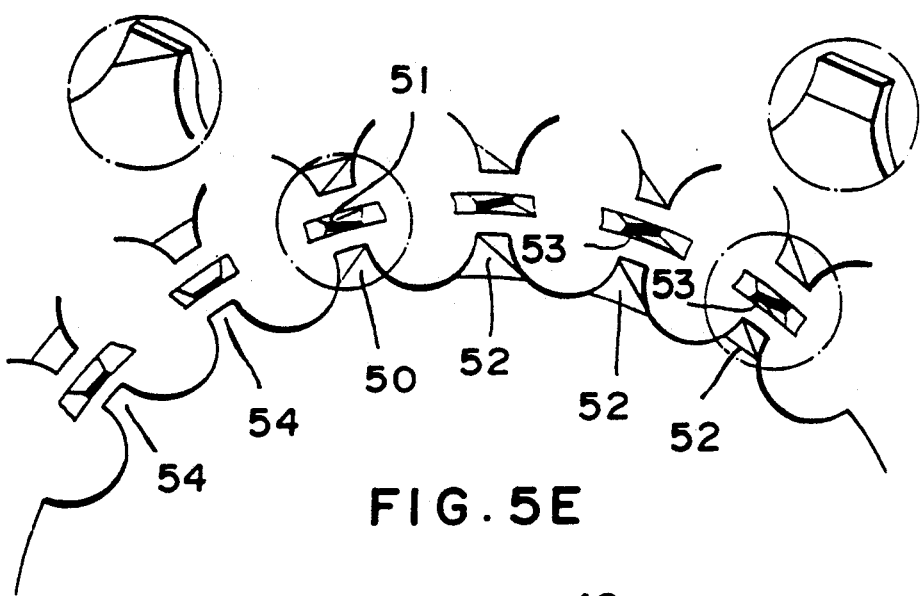
Figure 6:
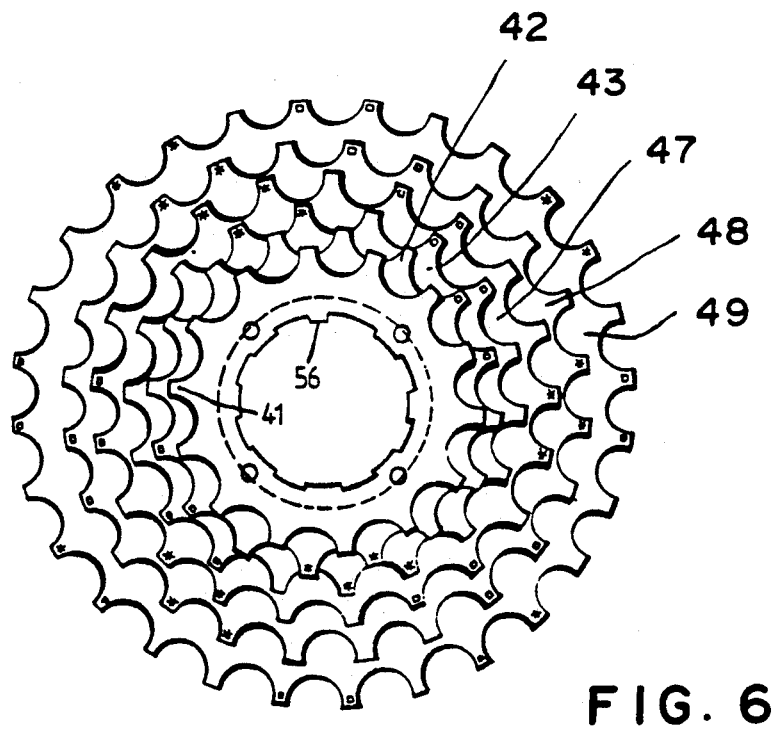
FIG. 6 illustrates the arrangement of the tooth forms of the flywheels of the bicycle rear-wheel hub assembly of the present invention.

Referring to FIGS. 3, 3A and 4, a bicycle rear-wheel hub assembly as constructed in accordance with the present invention is generally comprised of a hub 10, and inner casing 11, an outer casing 14, an axle 26, flywheels 19, 24, and several fastening elements. During assembly process, bearing seat 27, rubber rings 28, oil seal ring 39 and screw nut 29 are respectively mounted on the axle 26 at one end and inserted into the hub 10 with steel balls 13 retained between the hub 10 and the bearing seat 27 for rotary motion. The inner casing 11 is screwed into an inner thread 30 inside the hub 10, and then, the outer casing 14 is sleeved on the inner casing 11. The inner casing 11 has an annular 31 around the peripheral surface thereof between two symmetrical stop keys 12 for holding steel balls 131. The outer casing 14 is retained to the inner casing 11 by a left-handed cup 18. The left-handed cup 18 has an annular groove 32 for holding steel balls 132 which allows the outer casing 14 to be rotated on the inner casing 11. Another set of bearing seat 271, rubber rings 281, oil seal ring 391 and screw nut 291 is then mounted on the axle 26 at an opposite end. Then, the flywheels 19 are attached to the hub 10 with the inner projections 20 thereof respectively engaged into a plurality of elongated grooves 15 around the outer surface of the outer casing 14, and then, the first flywheel 24 is mounted on the outer casing 14 and attached to the flywheels 19 and an outer side. At the final, a lock ring 25 which has a non-skid tread 34 at one side is attached to the outer casing 14 to secure the flywheels 19, 24 in place. The first flywheel 24 has a non-skid tread 33 at an outer side which is engaged with the non-skid tread 34 on the lock ring 25 when the lock ring 25 is fastened in place.

Referring to FIGS. 3 and 3A again, the hub 10 has an inner thread 30 and a wheel shoulder 38 at one end, and a rubber ring 381 set inside said wheel shoulder 38 in front of said inner thread 30. The inner casing 11 has an outer thread 35 at one end engaged into the inner thread 30 in the hub 10 with the rubber ring 381 firmly squeezed in therebetween. Because of the arrangement of the rubber ring 381, the connection of the hub 10 with the inner casing 11 is reinforced against shearing force. The inner casing 11 comprises a tool hole 40 through which it can be conveniently detached from the hub by a tool. As indicated, the outer casing 14 has a plurality of elongated grooves 15 spaced from one another around the outer surface thereof in longitudinal direction for fastening the flywheels 19, 20. The elongated grooves 15 are same in size with the exception of a wider one for engaging a wider projection 20 from either flywheel 19. The flywheels 19 are comprised of the second through the seventh flywheels attached together by screws 37, each of the flywheels 19 having a plurality of inner projections 20 respectively engaged into the elongated grooves 15 on the outer casing 14. The inner projections 20 are same in size with the exception of an wider one for engaging into the wider elongated groove on the outer casing 14. By means of engaging the wider inner projections of the flywheels 19 into the wider elongated groove on the outer casing 14, the connection of the flywheels 19 to the outer casing 14 is secured against torsional force. Further, this arrangement prevents wrong loading of the flywheels 19 on the outer casing 14.

Referring to FIGS. 5A-5G and 6, the teeth of the flywheels (which are designated by the numeral 19 in FIGS. 3 and 4) may have different tooth form. In a 12-step variable speed bicycle according to the present invention, the teeth of the first flywheel 41 which is the smallest in outer diameter (see FIGS. 5A and 6) are all made in the same size each of which having the same slant angle at two opposite, namely, the front and rear sides. The tooth forms of the teeth of the second and third flywheels 42, 43 (see FIGS. 5C and 6) and the teeth of the fourth, fifth and six flywheels 47, 49, 49 (see FIGS. 5E and 6) shall be respectively made according to the chain link pitch and the flexibility of the bicycle chain and the distance between flywheels so that the bicycle chain can be loaded onto the teeth of either flywheel at a fixed point.

Referring to FIGS. 5C and 6 again, the teeth of the second and third flywheels 42, 43 are arranged by repeating a set of teeth including a chain loading tooth 44, which has two equal slant angles at the front and back sides and an angular interval 55 at the top at an inner side, three outward teeth 45 in front of the chain loading tooth 44, which outward teeth 45 are respectively inclined outward, and two inward teeth 46 at the back of the chain loading tooth 44, which inward teeth 46 are respectively inclined inward (the outward teeth 45 incline leftward while the inward teeth 46 incline rightward). During speed changing, the bicycle chain can be loaded onto the second or third flywheel through the inward teeth 46 or unloaded from the second or third flywheel from the chain loading tooth 44.

Referring to FIGS. 5E and 6 again, the fourth, fifth and sixth flywheels 47, 48, 49 each comprises a plurality of chain loading teeth 50 equidistantly arranged around the peripheral edge thereof for loading or unloading the bicycle chain. At the back of either chain loading teeth 50, there are two inward teeth 54, which incline inward, to help unloading the bicycle chain. In front of the either chain loading teeth 50, there are three outward teeth 52, which incline outward relative to the inward teeth 54, to help loading the bicycle chain. The outward teeth 52 each has an angular interval 53 at the top at an outer side (opposite to the angular interval on the loading teeth 50 at an inner side). By means of the arrangement of the angular intervals, friction or disengagement problem can be eliminated during shifting the bicycle chain, and therefore, the service life of the chain wheel, the bicycle chain and the flywheels can be extended.

Further, in an alternate arrangement of the present invention, the inner projections on each flywheel for engaging into the elongated grooves on an outer casing may include a smallest one 56, therefore, all flywheels can be quickly correctly arranged together by aligning the smallest inner projection 56.

What is claimed is:

1. A bicycle rear-wheel hub assembly comprising: a hub, an inner casing fastened in said hub at one side, an outer casing mounted on said inner casing, an axle inserted through said hub, a set of flywheels mounted on said outer casing, a plurality of fastening elements to fasten said axle and set of flywheels in place, said hub including an inner thread and a wheel shoulder at one end, and a rubber ring set inside said wheel shoulder in front of said inner thread; said inner casing having an outer thread at one end for engaging with said inner thread in said hub with said rubber ring firmly squeezed in therebetween, and a tool hole at an opposite end for inserting a tool during the process of dismounting, said set of flywheels including a first flywheel having teeth in regular angle of lead, a second flywheel and a third flywheel, said second and third flywheels each having at least one guide tooth, said at least one guide tooth each having an angular interval at the top at an inner side, three outward teeth in front of each of said at least one guide tooth respectively inclined outward and two inward teeth at the back of each of said at least one guide tooth respectively inclined inward, a fourth flywheel a fifth flywheel and a sixth flywheel, said fourth, fifth and sixth flywheels each having at least one lead tooth, said at least one lead tooth each having an angular interval at the top at an outer side and two slant angles at two opposite sides in reverse directions, three outward teeth in front of each of said at least one lead tooth being respectively inclined outward, and two inward teeth at the back of each of said at least one lead tooth respectively inclined inward.

2. The bicycle rear-wheel hub assembly of claim 1, wherein said outer casing comprises a plurality of elongated, longitudinally extending grooves around the outer wall surface thereof for fastening said set of flywheels, said elongated grooves including one having a width that is wider than at least one other of said elongated grooves.

3. The bicycle rear-wheel hub assembly of claim 2, wherein said set of flywheels includes seven flywheels with said first flywheel being separately arranged and the other six flywheels being attached together by screws, each flywheel having a plurality of inner projections projecting inward from a center hole at locations and in sizes corresponding to said plurality of elongated grooves on said outer casing.

4. The bicycle rear-wheel hub assembly of claim 1, wherein said set of flywheels includes seven flywheels of which the second, third and fourth flywheels are made in one tooth form and the fifth, sixth and seventh flywheels are made in another tooth form.

* * * * *